Oct. 19, 1943.    E. L. MARTIN    2,332,453
RETRACTABLE LANDING GEAR
Filed July 15, 1941    2 Sheets-Sheet 1

Eric L. Martin INVENTOR.
BY James M. Clark
His Patent Attorney

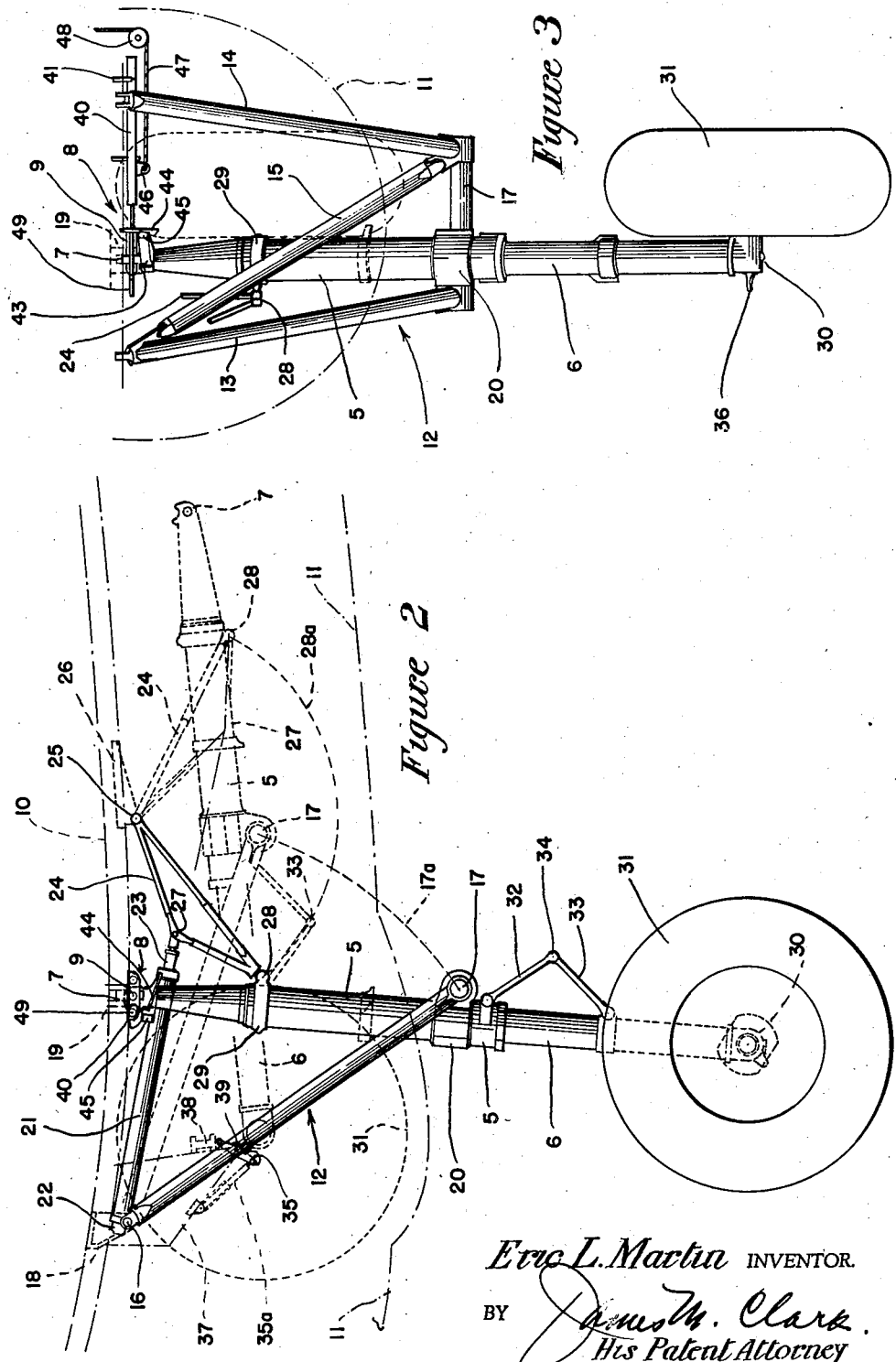

Patented Oct. 19, 1943

2,332,453

UNITED STATES PATENT OFFICE 2,332,453

RETRACTABLE LANDING GEAR

Eric L. Martin, Santa Monica, Calif., assignor to North American Aviation, Inc., Inglewood, Calif., a corporation of Delaware Application July 15, 1941, Serial No. 402,474

7 Claims. (Cl. 244—102)

The present invention relates to aircraft and more particularly to an improvement in retractable landing gears for aircraft.

Among the desirable requirements in the design of retractable landing gears are that the gear be automatically and positively extended into its landing position, that it be completely housed when retracted, and that its weight in being shifted between these positions be maintained within narrow limits in a fore and aft direction in order to prevent disturbance to the trim or balance of the airplane. It is also quite desirable to avoid the "breaking" or intermediate pivoting of the struts often found necessary in order to stow them completely within limited spaces. These requirements have been obtained to various extents by prior devices but have not been entirely successful particularly in connection with the main landing wheels of tricycle landing gears when they are required to be positioned beneath the rear portions of the wings.

The present invention is directed toward such improvements in the main landing gears of either the tricycle or other types, by providing a main shock absorbing strut which is guided bodily on two swinging frames or strut assemblies and further that none of the struts or links in the landing gear assembly are of the "breaking" or intermedially pivoted type. In accomplishing the above desirable features the present improvement also provides an arrangement in which the landing wheel is raised and lowered substantially vertically and the free upper terminal of the main strut is carried into its housing for stowage in a relatively confined space remote from the wheel and without the necessity of an enlarged opening in the surface of the body which houses the gear.

It is accordingly an object of the present invention to provide a retractable landing gear which is automatically lowered and locked in its down or extended position by virtue of its own weight when it is released, and the action of the airstream as soon as it is exposed beyond its housing. A further object resides in the provision of a landing gear having a single shock absorber strut of the "non-breaking" type which is bodily carried between its retracted and extended positions by swinging radius members pivoted at spaced points to the main strut. It is a further object of the present invention to provide a landing gear which can readily be mounted beneath the rear portion of a wing and in which there is relatively little fore and after shifting of its center of gravity between its extreme positions. Other objects of the present invention reside in the novel arrangement of the main strut in being automatically latched in its extended position, and being free and unattached when unlatched such that it can be bodily moved, without the necessity of a guide means or other directly attached linkage, into a relatively limited space.

Other objects and advantages of the present invention will become apparent to those versed in the art after a reading of the present specification and the drawings forming a part hereof, in which:

Fig. 2 is a side elevation of the landing gear shown in full lines in extended, and dotted in the retracted position; and Fig. 3 is a front elevation of the same.

Figure 1:
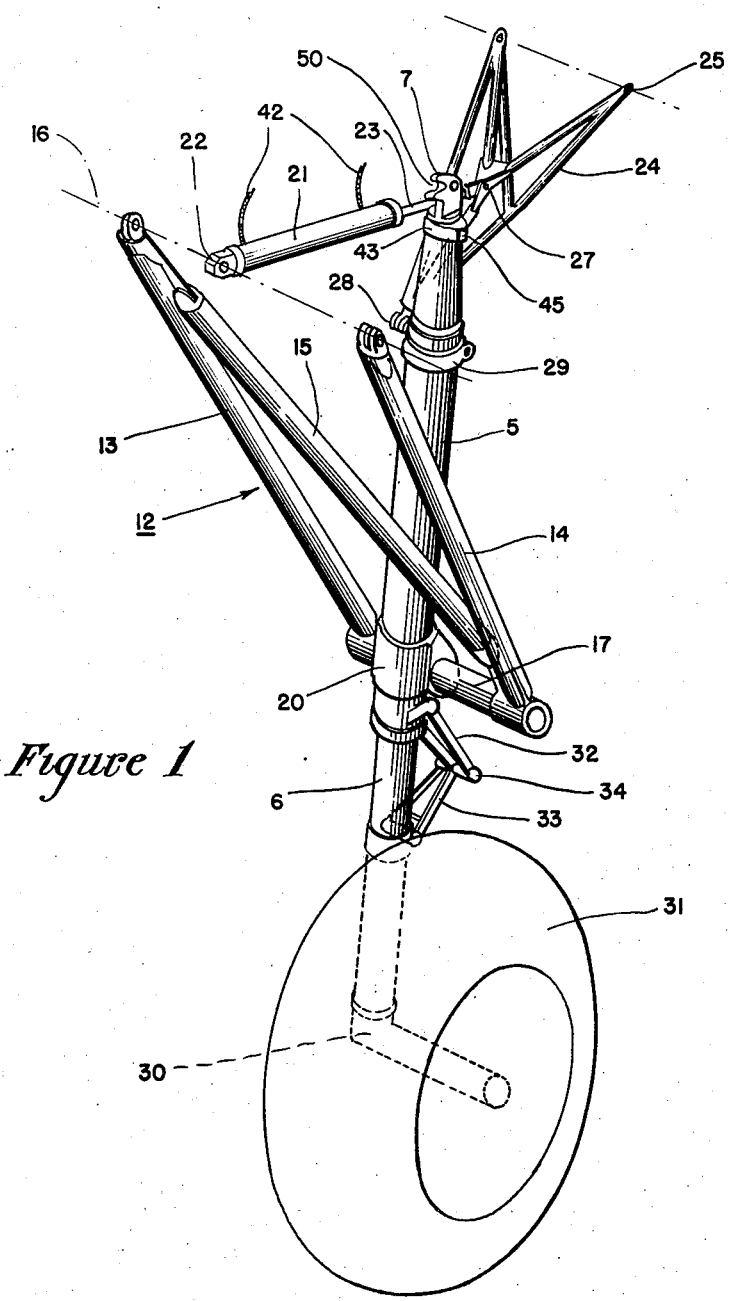
Fig. 1 is a perspective view of the landing gear assembly removed from the aircraft structure.

Referring now to Figs. 1 and 2, the numeral 5 indicates the cylinder portion of the main shock absorbing strut within which the wheel-carrying or piston portion 6 is adapted to resiliently telescope due to the weight of the airplane being carried upon the landing wheels, or due to shocks which may be imparted to the latter. The upper terminal of the main strut 5 is provided with an apertured fitting 7 which is adapted to be automatically engaged in the extended position of the landing gear by the lock, or latch 8, and its sliding pin 9. The landing gear is shown supported from the lower side of the rear portion of the supporting wing structure 10 and is arranged to extend through a suitable opening in the bottom of the engine nacelle 11 which is also supported from the wing structure. The teachings of the present invention are, however, utilizable in landing gears for the support of other portions of the wing or the fuselage and may housed directly in either, instead of in the nacelle only as shown.

The main landing strut 5 is braced upwardly and forwardly to the wing structure by the radius frame 12 comprising the upwardly divergent struts 13 and 14 and the diagonally disposed member 15 each of which are apertured at their upper terminals to engage the hinge, or pivot rod 16, which is supported from the wing structure by the bearing brackets 18. The struts 13 and 14 form a modified N frame provided at its lower extremities with suitable fittings between which extends the pivot rod 17, which is free to pivotally rotate within the collar fitting 20 provided on the main landing gear strut 5. In addition to serving as a guiding or radius member during retraction, the N frame also serves to transmit vertical, transverse and drag loads from the strut 5 to the wing structure 10.

The landing gear retracting means comprises a hydraulic actuating mechanism consisting of a a cylinder element 21 free to partially rotate about the axis of its forward pivot by virtue of its pivotal terminal fitting 22, and has extended from its outer extremity the piston rod 23. Suitable flexible hose connections 42 are provided adjacent each terminal of the cylinder 21 for the admission or release of hydraulic fluid for actuation of the piston in a manner well known to the art. A triangular pyramidal frame 24 is pivotally supported at its base or rear portion by the pivots 25 to the spaced bracket fitting 26 supported from the wing structure 10. The apex or forward extermity of the triangular frame 24 is provided with a pivotal connection 28 to the main strut 5 at its pivot bearing fitting 29. The third pivot at the intermediate apex of the frame 24 is provided with a pivotal connection 27 to the free end of the piston 23.

The wheel 31 is suitably journalled for rotation upon the axle fitting 30 fixed to the lower extremity of the piston portion 6 which is prevented from rotating with respect to the cylinder portion 5 by means of the torque scissors comprising the upper and lower links 32 and 33 pivotally attached to the cylinder element 5 and the piston element 6, respectively, and intermediately connected by the pivot pin 34.

The landing gear is held in its retracted position, indicated by the dotted lines in Fig. 2, by means of the extended piston 23 which pushes the upper terminal of the strut 5 rearwardly, rocking the frame 24 rearwardly about its pivot 25, and the frame 12 upwardly and rearwardly about its pivot 16. The landing gear assembly is locked in this position and kept from swaying or vibrating in flight by means of the holding latch 35 supported from the bracket 37. This latch rotates about pivot 39 on the bracket and has a hook portion which engages the eye-fitting 36 on the lower strut element 6, being normally held in the latched attitude by the locking cylinder link 35a containing a compression spring normally tending to extend the link. An actuating cylinder 38 is supported by the bracket 37 and has its piston attached to the oppositely extending portion of the hook latch 35 such that when actuated by the pilot or operator the latch is caused to rotate about its pivot 39, thereby releasing the lower or forward end of the landing gear, permitting it to drop due to its own weight.

The latching assembly 8 comprises a cylindrical housing 40 within which the end of the pin is adapted to telescope, being urged into its extended position at all times by a suitable compression spring. A slot is provided through the lower wall of the housing 40, which is supported from the wing by the lugs 41, to permit rectilinear movement of the ear 46 forming an integral part of the pin assembly which is also provided with a cam member 44. The upper terminal fitting 7 of the main strut 5 is provided with a roller bracket 43 carrying a roller 45 which is adapted to engage the cam 44 as the strut traverses the fore and aft path determined by the pivotal swinging of the radius frames 12 and 24. The ear portion 46 of the pin 9 is suitably apertured for a cable 47, or other flexible means guided by suitable sheaves 48, by which the pin 9 may be retracted against the pressure of the spring (not shown) to release and unlatch the fitting 7 of the strut prior to retraction. An auxiliary rod 49 carried by the movable latch assembly 8 serves to limit the strut movement and occupies the bifurcation 50 when in extended position.

In order to retract the landing gear the upper terminal 7 of the landing gear strut 5 is released from the pin 9 by pull exerted upon the cable 47. This unlatches the terminal fitting 7 from the fixed eye 19 and also permits the roller 45 to move past the cam 44 on the ear portion of the latch assembly 8. At the same time a suitable hydraulic operating valve is opened and fluid pressure is passed through the forward flexible hose connection 42 into the cylinder 21 forcing the piston 23 rearwardly. As the frame 24 is rotated in a counter-clockwise direction about its pivot 25 as viewed in Fig. 2, it carries the upper portion of the strut 5 rearwardly into the confined space of the tail of the nacelle 11. As the upper portion of the strut is moved rearwardly at the end of the frame 24 it rocks about the pivot 28 and also draws the larger N frame rearwardly while at the same time rocking it about its pivot 16, also in a counter-clockwise direction. Since the pivot 28 follows the path indicated by the dotted lines 28a which is crossed by the path of the pivot 17, indicated by the dotted arc 17a, the main landing gear strut 5—6 is bodily rotated in a clockwise direction until it assumes an almost horizontal position within the lower portion of the nacelle 11 in which the wheel 31 is fully retracted within the nacelle.

As the strut 5—6 approaches its fully retracted position the fitting 36 near its lower extremity engages the hook portion of the latch 35 causing it to rotate slightly about its pivot 39 and against the compressible link 35a sufficiently to permit the fitting 36 to pass over the edge of the hook. When this occurs the link 35a rotates the hook sufficiently to engage the fitting 36 and thereby lock the landing gear assembly in its fully retracted position. The movement of the piston 23 within the cylinder 21 is preferably designed such that when the piston reaches its extended limit against the outer end of the cylinder, as indicated by the dotted lines in Fig. 2, the landing gear strut 5—6 reaches the limit of its retracting movement at which it is automatically locked by the latch 35 and is held in this position, even though the fluid pressure may subsequently be reduced on both sides of the piston 23.

In extending the landing gear all that it is necessary for the pilot or operator to do is to actuate the fluid cylinder 38, to rotate the lock 35, thereby releasing the forward, or wheel end, of the strut 5—6, making certain at the same time that the pressure has been reduced or released from the flexible conduit 42. Due to the overhanging or unbalanced weight of the landing gear assembly the wheel end will immediately drop due to gravity, causing it to extend through the opening in the bottom of the nacelle 11. The landing gear assembly will continue to fall, being assisted by the force of the relative wind due to the forward flight of the airplane, causing the frames 12 and 24 to rotate in clockwise directions about their respective pivots 16 and 25, the pivotal connections to the main strut at 17 and 28 following the arcuate paths 17a and 28a. As the main landing gear strut 5—6 is thus caused to rotate bodily in a generally counter-clockwise direction, the apertured terminal fitting 7 approaches the latching mechanism 8, and as it reaches it the roller 45 on the bracket 43 engages the cam 44 in advance of the apertured terminal 7, causing the pin 9 to be retracted within the housing 40 against the action of its compression spring, thereby permitting the aperture to become aligned with the axis of the pin 9. The rod 49 adjacent the pin 9 serves to limit the forward movement of the strut and to assist in the alinement of the pin 9 and the apertured fitting 7. At this point the roller 45 has passed beyond the cam 44 which is thus released and under the action of the spring in the housing 40 the pin 9 is permitted to extend forwardly from the end of the housing and to engage the opening in the strut terminal fitting 7, thereby automatically locking it into the operative position of the landing gear.

Other advantageous forms and modifications of the present invention which may occur to those skilled in the art, both as to general arrangement and detailed design, are all intended to fall within the scope and spirit of this invention as more clearly set forth in the appended claims.

I claim:

1. A retractable landing gear for aircraft comprising a strut, radius members pivotally attached to spaced pivots on said strut and to remotely spaced pivots on said aircraft, the said pivots on said aircraft being disposed on opposite sides of said strut in its extended position, the upper terminal of said strut being free of any attachment to the aircraft in all but its locked position, and means associated with one of said radius elements for the retraction and extension of said landing gear.

2. In aircraft, a retractable landing gear, a substantially vertical strut comprising an upper element detachably locked to the aircraft and a resiliently associated lower wheel-carrying element, radius means connecting the lower portion of said upper element with a pivot disposed on the aircraft forwardly with relation to said strut for guiding said strut portion upwardly and rearwardly along an arcuate path, separate radius means connected to a pivot disposed on said aircraft rearwardly with relation to said strut for guiding an intermediate portion of said upper element rearwardly along a separate arcuate path, and actuating means connected to one of said guiding means for enforcing retracting movements of said strut.

3. A retractable landing gear for aircraft comprising a strut, radius members pivotally supporting spaced pivotal connections on said strut from spaced pivotal connections on said aircraft disposed on opposite sides of said strut, locking means associated with the upper terminal of said strut for fixing the same to the aircraft in the extended position of the landing gear, and actuating means connected to one of said radius members and pivotally attached to the aircraft in the region of the pivot of the other of said radius members for the rotation of said members and said strut into its retracted position.

4. In a retractable landing gear for aircraft, a substantially vertical wheel-carrying strut, vertically spaced pivots on said strut, means disposed forward of said strut for guiding the lower pivot rearwardly and upwardly in a substantially arcuate path, means disposed rearward of said strut for guiding the upward pivot rearwardly in a substantially arcuate path, an actuating device associated with one of said pivotal means for moving said strut bodily along said paths from an extended to a retracted position.

5. In a retractable landing gear for aircraft, a substantially vertical wheel-carrying strut, vertically spaced pivots on said strut, means disposed forward of said strut for guiding the lower pivot rearwardly and upwardly in a substantially arcuate path, means disposed rearward of said strut for guiding the upward pivot rearwardly in a substantially arcuate path, an actuating device associated with one of said pivotal means for moving said strut bodily along said paths from an extended to a retracted position, said arcuate paths crossing each other at a point rearward of said extended strut position.

6. In a retractable landing gear for aircraft having a main shock absorbing strut comprised of an upper cylinder element and a lower piston element, radius members connecting spaced pivotal connections on said cylinder element to spaced pivotal connections on the aircraft, actuating means connected to one of said members for the retraction of said landing gear, the said members being substantially perpendicular to each other in the extended position and substantially parallel to each other in the retracted position of the gear, and separate means for locking the cylinder element to the aircraft in the extended position and the piston element to the aircraft in the retracted position of the landing gear.

7. A retractable aircraft landing gear comprising a main shock absorbing strut having upper and lower telescoping elements, radius members connecting spaced pivotal connections on said upper element to spaced pivotal connections on the aircraft, actuating means connected to one of said radius members for the retraction of said landing gear, the said radius members being substantially perpendicular to each other in the extended position and substantially parallel to each other in the retracted position of the landing gear, and means for locking the upper strut element to the aircraft in the extended position and the lower strut element to the aircraft in the retracted position of the landing gear.

ERIC L. MARTIN.